United States Patent [19]
Suita et al.

[11] Patent Number: 6,004,019
[45] Date of Patent: Dec. 21, 1999

[54] INTEGRATED CONTROL SYSTEM FOR A WORK ROBOT

[75] Inventors: Kazutsugu Suita, Toyota; Yoshitaka Sakamoto, Nagoya, both of Japan

[73] Assignee: Toyota Jidosha Kabushiki Kaisha, Toyota, Japan

[21] Appl. No.: 08/868,575

[22] Filed: Jun. 4, 1997

[30] Foreign Application Priority Data

Jun. 4, 1996 [JP] Japan .................................. 8-141734

[51] Int. Cl.⁶ ............................. G06F 19/00; G06G 7/66
[52] U.S. Cl. ...................................... 364/477.06; 364/131
[58] Field of Search ............................. 364/477.06, 131; 228/102; 219/10.67, 111, 86.25; 395/93; 318/568.12

[56] References Cited

U.S. PATENT DOCUMENTS

| | | | |
|---|---|---|---|
| 4,807,153 | 2/1989 | Onaga et al. ........................... | 364/513 |
| 5,574,637 | 11/1996 | Obata et al. ............................ | 364/131 |
| 5,621,672 | 4/1997 | Kobayashi et al. ...................... | 364/579 |
| 5,641,415 | 6/1997 | Kosaka et al. ........................ | 219/86.25 |
| 5,754,869 | 5/1998 | Holzhammer et al. ............ | 395/750.01 |

FOREIGN PATENT DOCUMENTS

| | | |
|---|---|---|
| 6-312275 | 11/1994 | Japan . |
| 6-312276 | 11/1994 | Japan . |
| 7-144283 | 6/1995 | Japan . |

*Primary Examiner*—William Grant
*Assistant Examiner*—Victoria Robinson
*Attorney, Agent, or Firm*—Pillsbury Madison & Sutro LLP

[57] ABSTRACT

An integrated control system for a work robot may be used for controlling multiple work robots as well as multiple work tools connected to the work robots. The integrated control system includes a robot control central processing unit (CPU), at least one work control CPU, a shared memory, and a system bus constructed to transmit information between each of the CPUs and the shared memory. The robot control CPU, the work control CPU, and the shared memory are connected to the system bus.

7 Claims, 3 Drawing Sheets

INTEGRATED CONTROL SYSTEM FOR A WORK ROBOT

This application is based on application No. HEI 8-141734 filed in Japan on Jun. 4, 1996, the content of which is incorporated herein by reference.

BACKGROUND OF THE INVENTION

1. Field of the Invention

The present invention relates to an integrated control system (apparatus) for a work robot that is capable of processing robot control and work tool control at a high speed.

2. Description of Related Art

Japanese Patent Publication No. HEI 7-144283 discloses a control system wherein a robot control system and a work tool (servo welding gun) control system are linked by a communication channel (telephone line). More particularly, in the control system, the robot control CPU (central processing unit) and the servo gun control CPU are constructed independently of each other and are connected by the communication channel, causing the robot and servo gun control units to have a large space therebetween and operate independently of each other.

However, the above-described system has the following problems:

(1) It takes a relatively long communication time period to link the CPUs. It is impossible to conduct parallel calculations because of its limited calculation ability. As a result, control of peripheral equipment is delayed, which lowers the control characteristic of the control system.

(2) Since it is impossible to conduct real time, simultaneous control of both the pressing force and welding electrical current during welding, a high grade of weld cannot be yielded.

(3) A hardware such as a communication channel between the units and a software such as a control logic must be prepared to accommodate the independent circuits even though it greatly complicates the circuitry overall.

(4) Despite these problems, there is common information, such as pressing force information, locus information, and input/output information from and to the peripheral equipment in the work control and the robot control, and yet this information has not been previously used together in one common circuit. In addition, the control unit was constructed such that the information about the welding electrical current, the expansion amount of the plates to be welded, and the electrical resistance between the electrodes could not be fed back from the work control to the robot control.

SUMMARY OF THE INVENTION

An object of the present invention is to provide an integrated control system for a work robot that is capable of raising a processing speed for transmitting information between a robot control CPU and a work tool control CPU and enables real time control of linked robot control and work tool control.

(1) An integrated control system for a work robot according to the present invention includes a robot control CPU, a work tool control CPU, a shared memory (common memory), and a system bus to which each of the CPUs and the shared memory are connected and which transmits information between each of the CPUs and the shared memory.

(2) The integrated control system for a work robot may further include a network CPU through which the integrated control system for a work robot is connected with another integrated control system for a work robot.

With the above described integrated control system for a work robot, because all of the CPUs are integrated by the common system bus, transmission of information between the CPUs is conducted quickly. As a result, the robot control and the work tool control (for example, a pressing force control tool control and a welding current control tool control) are linked with each other and are driven in parallel with each other, and real time control thereof is possible.

Further, since the system bus is shared by all of the CPUs, the structure for transmitting information between the CPUs is simplified, the CPU packaging can be shared, the unit can be compact and lightened, the information can be shared between the CPUs, the system start-up is simple, and the system has greater resistance against external noise.

With the above described integrated control system for a work robot including a network CPU, redundant operation with peripheral equipment is possible to improve system reliability. Therefore, even if one robot happens to malfunction, the malfunctioning robot can be backed up by another robot.

BRIEF DESCRIPTION OF THE DRAWINGS

The above and other objects, features, and advantages of the present invention will become apparent and will be more readily appreciated from the following detailed description of the preferred embodiment of the present invention in conjunction with the accompanying drawings, in which.

DETAILED DESCRIPTION OF THE PREFERRED EMBODIMENT

Figure 1:
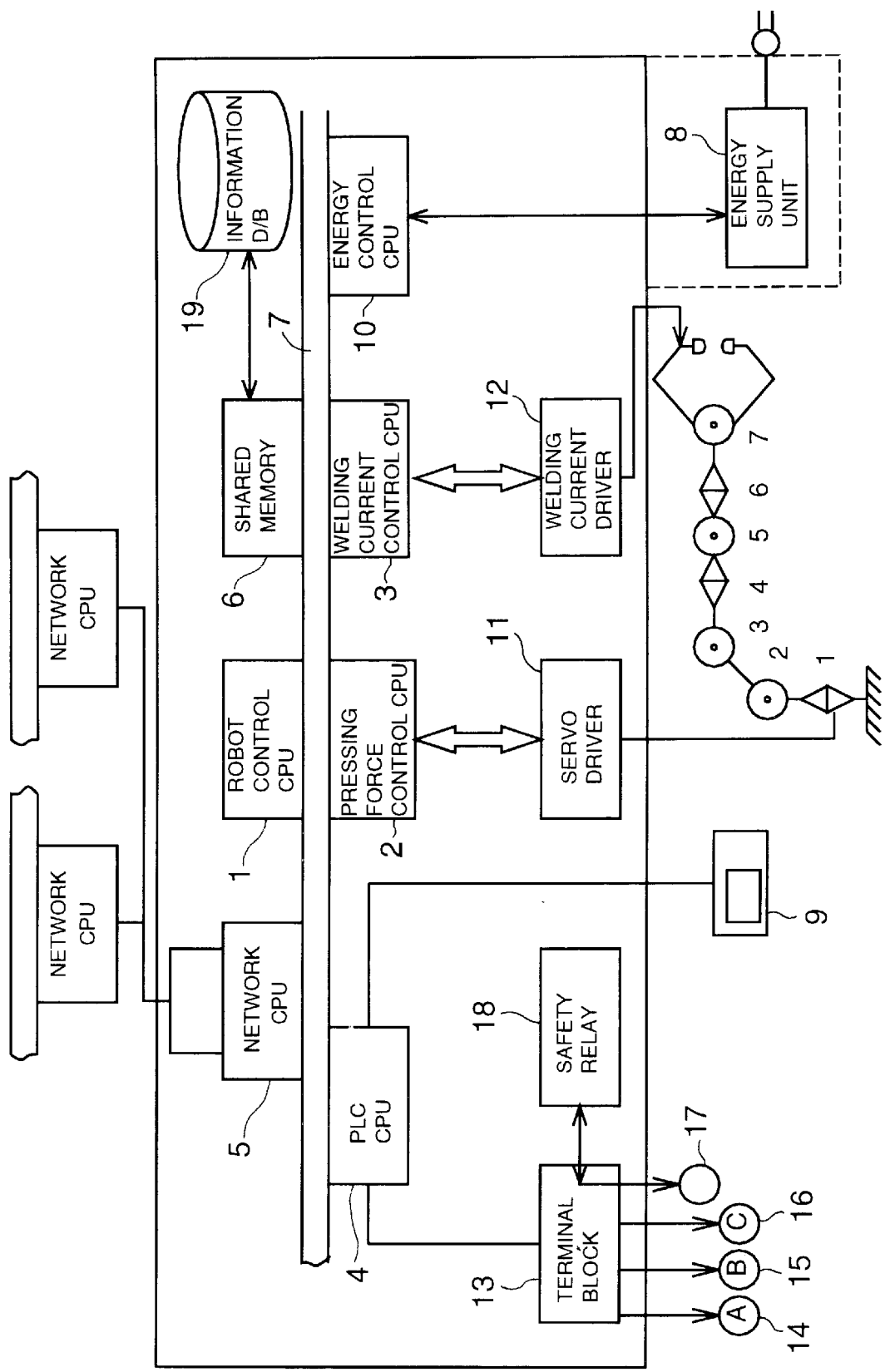
FIG. 1 is a system diagram of an integrated control system for a work robot according to one embodiment of the present invention.

As illustrated in FIG. 1, an integrated control system for a work robot according to one embodiment of the present invention includes a robot control CPU 1, a work tool control CPU (which includes a pressing force and position control CPU 2 and a welding electrical current control CPU 3 for spot welding in the embodiment of FIG. 1), a peripheral equipment control CPU 4 which is of a programmable logic control type, a network CPU 5, an energy control CPU 10, and a shared memory (common memory) 6, each of which is formed in the form of a board and is connected to a common system bus 7, which may be a standard bus.

The content of each CPU and memory will be explained below.

The robot control CPU 1 is constructed to control a locus (a position, a speed, an acceleration and a force at any point on the locus) of the robot and to control a servo motor of each axis R1–R6 of a six articulation robot via a corresponding servo driver 11.

The work tool control CPU is constructed to control a particular tool. The tool varies according to the kind of work required. More particularly, in the case of spot welding, the work tool control CPU includes an electrode pressing force control CPU 2 and a welding electrical current control CPU 3, and in a case of sealer coating, the work tool control CPU includes a sealer supply control CPU (not shown). In the discussion below, the case of spot welding will be used as an example.

The pressing force control CPU 2 is constructed to control an instruction which is fed to an electropneumatic proportional control valve, thereby controlling the pressing force, in a system where the electrode of the welding gun is driven by an air cylinder. In a system where the electrode of the welding gun is driven by an electric actuator, the pressing axis may be counted as a seventh axis of the six-axis robot so that the pressing force control can be conducted by a single robot control CPU (which is an integrated robot control CPU containing the robot control CPU 1 and the pressing force control CPU 2). In this case, the integrated CPU of the robot control CPU 1 and the pressing force control CPU 2 may be formed on a single board.

The welding current control CPU 3 is constructed to instruct a driver 12 (timer contactor) for controlling the welding current. A welding current signal, a signal corresponding to an electrical resistance between the electrodes and a signal corresponding to a temperature between the electrodes are fed back to the welding electrical current control CPU 3. The welding electrical current control CPU 3 can be a multi-task control CPU.

The peripheral equipment control CPU (PLC•CPU) 4 is constructed to control input/output signals to and from the peripheral equipment, such as tip dresser and interlock signals from the production line. The PLC•CPU 4 is connected with each piece of peripheral equipment 14, 15, 16 via a terminal block 13. A safety relay 18 is provided in the terminal block 13 so that emergency stopping of the production line is possible.

The PLC•CPU 4 is connected with an operation unit 9 via a communication line. The operation unit 9 is a type of user interface through which an operator can access the CPU.

The network CPU 5 is an interface CPU between robots and is constructed to issue an interlock signal between the robots and to issue or receive tool signals between the robots. More particularly, a plurality of integrated systems for a work robot can communicate with each other by connecting the network CPUs of the integrated systems for a work robot using a communication line. The network CPU 5 and the PLC•CPU 4 may be integrated and formed on a single board.

The shared memory 6 is a common memory of the CPUs 1–6 and is an IC memory (semiconductor memory). The shared memory 6 is also formed in a board and can be connected to the standard bus. The shared memory 6 is connected to a data base 19 by the communication line so that the memory 6 can receive production information from other robots and machine tools.

The energy control CPU 10 is constructed to conduct energy control, automatic system power-up and system power-down, and noise control. The energy unit 8 operates according to the instruction from the energy control CPU 10. The energy unit 8 includes a power source for supplying electrical power to each of the above CPUs and the drivers and the control apparatuses therefor.

Figure 2:
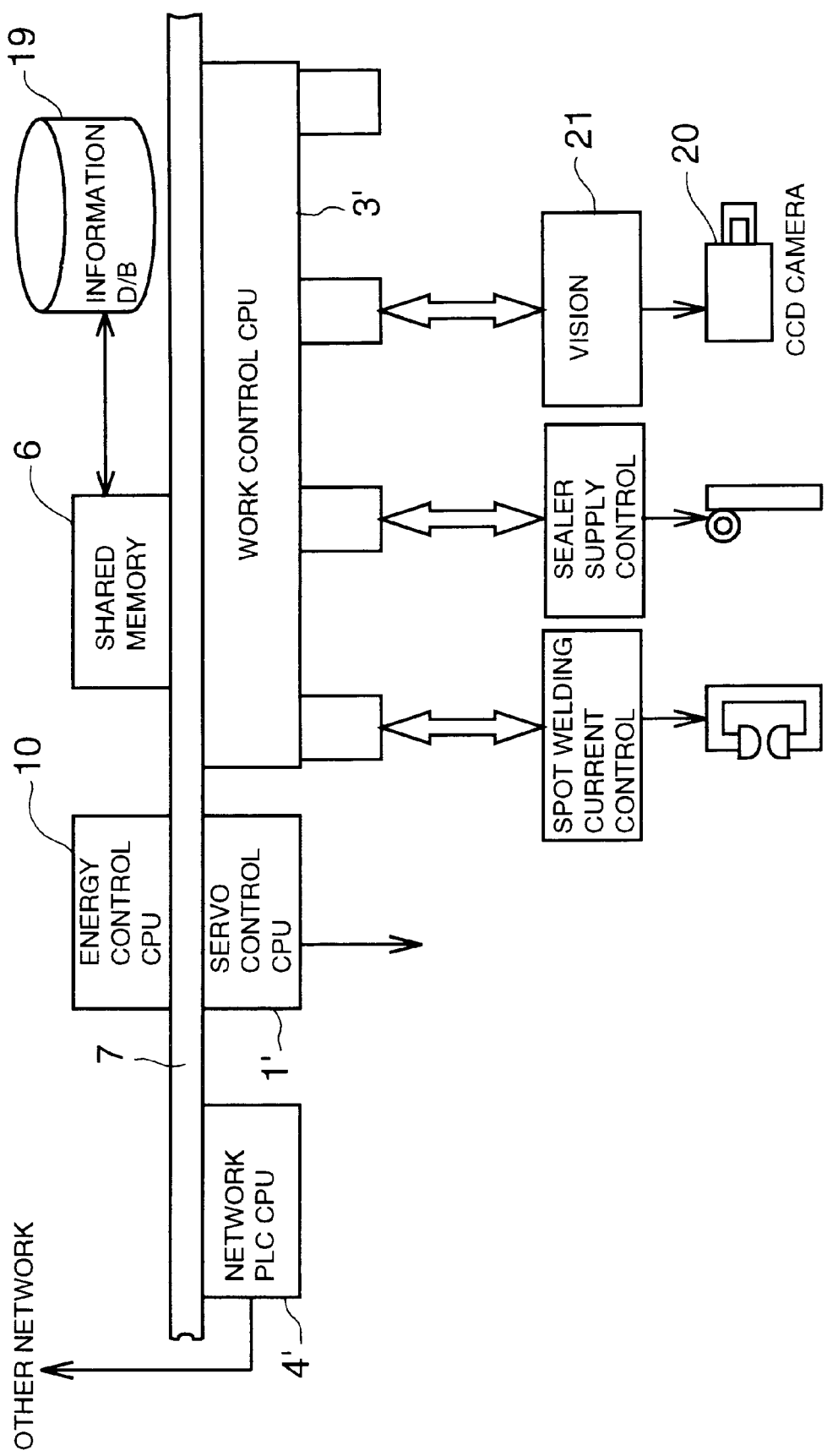
FIG. 2 is a system diagram of the integrated control system for a work robot FIG. 1 wherein some of the CPUs are integrated.

FIG. 2 illustrates a case where the robot control CPU 1 and the pressing force control CPU 2 are arranged in a single CPU 1', the PLC•CPU 4 and the network CPU 5 are arranged in a single CPU 4', and the welding electrical current control CPU 3 is a multi-task control CPU 3'. The multi-task (sealant coating, laser and vision) control CPU 3' is preferably extendable in its application. In the embodiment shown, a CCD camera 20 and its vision controller 21 are connected to the application-extended terminals.

The system bus 7 is a shared communication bus for the above CPUs 1–5, and 10 and the memory 6.

Though a standard bus (for example, a VME bus supplied by Motorola or some other standard bus) is used for the bus 7 in the embodiment of the present invention shown, an original, specially designed bus may be used for the bus 7. The bus is a collection of signals and is used for transmitting signals between the boards at a high speed. Generally, a bus between boards is a system bus, and a bus which is standardized so as to be exchangeable can be a system bus. By using a system bus, constructing a system is easily accomplished by selecting modules (each containing a CPU and a memory) and connecting them together, and modifying the system can be performed easily by changing the modules in the bus unit.

Each CPU and memory is formed in a board, more preferably in a standard-sized board (for example, a Eurocard sized board). The connector of the board to the backplane of the bus is a DIN connector.

In the VME bus, for connection of the board to the backplane of the bus, two 96-pin DIN connectors called P1 and P2 are used. The P2 connector is used when the extended function is used. Among the signal lines of the VME bus, columns A and C of P2 are open for users (board user). In the embodiment of the present invention, the respective data of the above-described CPUs are allotted to the user definition range.

The data of each CPU form a hierarchical structure as illustrated in TABLE 1, and each of these data is allotted to the respective address of the bus via each respective pin.

TABLE 1

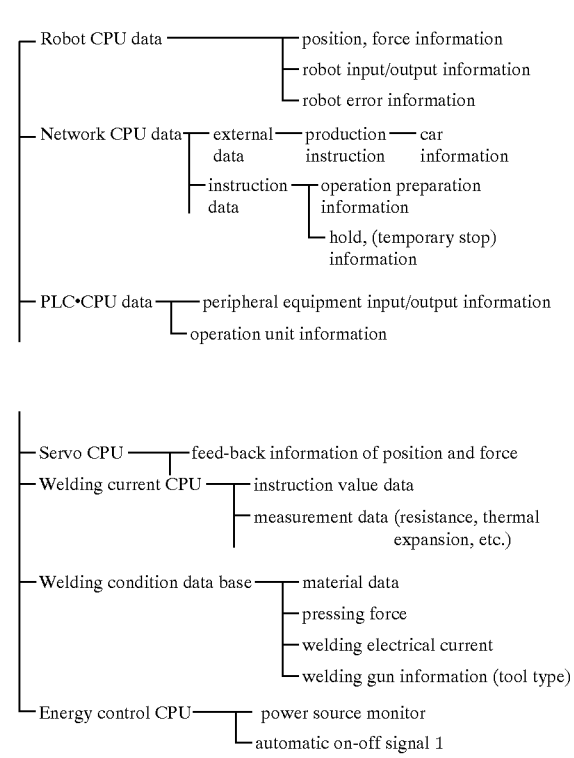

Figure 3:
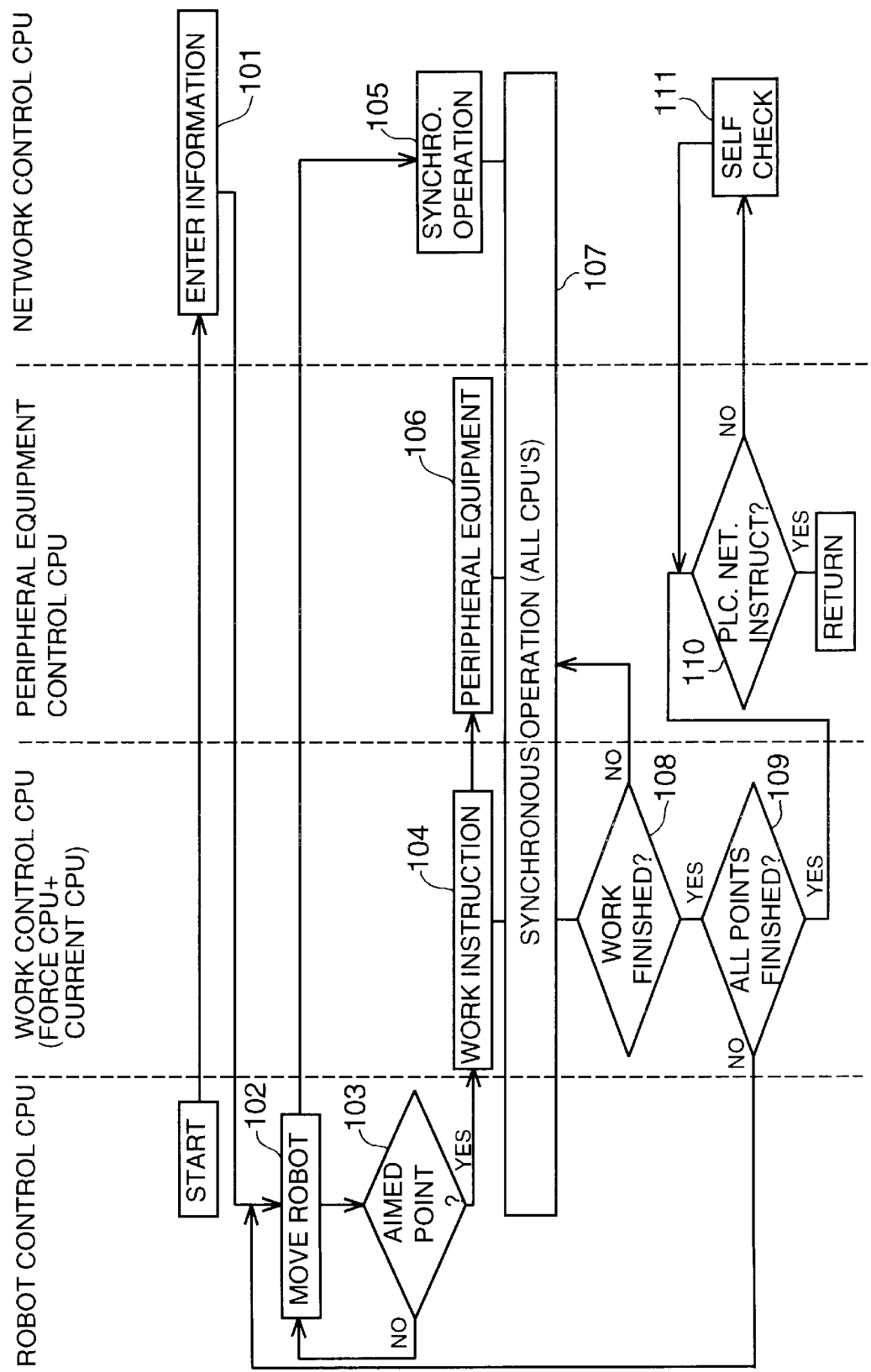
FIG. 3 is a block diagram of operation of the integrated control system for a work robot of FIG. 1.

FIG. 3 illustrates an example of synchronous operation conducted using the above-described control system.

After the control starts, at step 101 the robot locus information of other robot systems is entered through the network CPU 5 and the instant work condition information is entered from the data base 19. Then, at step 102, the robot is operated by the robot control CPU 1 so that the servo welding gun moves to a first spot welding point. When arrival of the welding gun to the first welding point is acknowledged at step 103, at step 104 the pressing force control CPU 2 issues a pressing control instruction and the welding electrical current control CPU 3 issues a welding electrical current control instruction. At the same time, at step 106, the PLC•CPU 4 issues a peripheral equipment control instruction, and at step 105, instruction of synchronous operation with other robots is issued through the network control CPU 5. Then, at step 107, synchronous operation of the robot and the work tools (for example, synchronous operation of the pressing force control and the welding electrical current control, and synchronous operation of spot welding of the instant robot and spot welding of another work robot) is conducted in real time. In this instance, since transmission of signals between the CPUs is conducted in the system bus through one integrated control system and not via a telephone line and an optical communication line, the transmittal is conducted at a very high speed so that real time control is possible.

When it is recognized at step 108 that work at one welding spot has been completed, at step 109 a decision is made as to whether or not spot welding has been performed at all of the points needing to be spot-welded. In the case of a NO at step 109, the welding gun is moved to the next welding point and steps 102 to 108 are repeated again.

In the case of a YES at step 109, at step 110 the PLC•CPU 4 and the network CPU 5 are operated so that operation of the instant robot and operation of other robots are linked, and the peripheral equipment begins operation. Then, at step 111, for example, electrode tip dressing is conducted. When these controls are finished, the routine returns to the start step for spot-welding successive work pieces.

Since the operations of the multiple CPUs 1 through 5 are linked via the common bus 7, the information transmittal speed is very high as compared with the conventional system using a communication line such as a telephone line for information transmittal, and the information on the bus can be utilized in common between the various CPUs. For example, the pressing force information of the pressing force control CPU 2 is shared on the system bus 7 by other CPUs. The pressing force information of the pressing force control CPU 2 is stored in the shared memory 6 and can enter any CPU in real time so that the pressing force information can be utilized in real time by other CPUs, even in the controls of the welding electric current control CPU 3, the peripheral equipment control CPU 4 and the network CPU 5. Similarly, the locus information also can be utilized in real time in the controls of the welding electric current control CPU 3, the peripheral equipment control CPU 4 and the network CPU 5.

Further, in the spot welding process, control of movement of the welding gun and control of the pressing force can be conducted synchronously and simultaneously. In the conventional system having a plurality of work robots, information about the spot welding points must be given to each work robot separately. In contrast, in the system of the present invention, the information about the spot welding points can be given to only one work robot because the same information can be utilized between the robot and other robots via the network CPUs 5.

Further, by linking the peripheral robots with the instant robot via the network CPUs thereof, even if one robot causes a fault and stops, the welding operations of the malfunctioning robot are shared by the remaining operational robots so that a large decrease in the production efficiency is easily prevented.

Further, since the CPUs 1 to 5 and 10 and the memory 6 can be controlled on the bus 7, integral control of all the CPUs and memory is possible. In this instance, since the information can be directly monitored from the bus 7, a real time linkage control is possible, which improves system safety. Since the communication means is integrated, reliability of communication increases, and the system is resistant to outside noise so that a separate noise protection device does not need to be provided.

Further, since the work control CPU is formed in the form of a board, even if CPU trouble occurs, system revival is kept simple by replacing the CPU board with a new one. The packaging containing the control CPUs therein is commonly used for all of the CPUs, and the system can be kept compact and light.

With the energy control, by controlling the system-up sequence and the power supply, revival of the system will be smooth and energy savings will be obtained.

Although the present invention has been described with reference to a specific embodiment, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. An integrated control system for a work robot comprising:
    a robot control CPU for operating a number of robots, the robot control CPU being separate from the number of robots;
    at least one work tool control CPU;
    wherein the at least one work tool control CPU is separate from the number of work tools, and separate from the robot control CPU; and
    wherein the at least one work tool control CPU includes a pressing force control CPU for spot welding and a welding current control CPU for controlling a current associated with the spot welding, each of said robot control CPU, said pressing force control CPU, and said welding current control CPU being formed in the form of a board and being separate from each other;
    a shared memory shared by said robot control CPU and said work tool control CPU; and
    a system bus constructed to transmit information between each of said CPUs and said shared memory, wherein said robot control CPU, said work tool control CPU, and said shared memory are coupled to said system bus and are integrated with each other through said system bus so that said system bus is used in common with said CPUs and said shared memory.

2. An integrated control system according to claim 1, further comprising a network control CPU coupled to said system bus, and wherein said integrated control system is connected via said network control CPU with a second integrated control system for a work robot.

3. An integrated control system according to claim 2, further comprising a peripheral equipment control CPU of a programmable logic control (PLC) type.

4. An integrated control system according to claim 3, wherein said network control CPU and said peripheral equipment control CPU are formed in a common board.

5. An integrated control system according to claim 1, further comprising an energy control CPU coupled to said system bus.

6. An integrated control system according to claim 1, wherein said robot control CPU and said work tool control CPU are formed in a board and said system bus is a standard bus.

7. An integrated control system for a work robot comprising:

- a robot control CPU for operating a number of robots, the robot control CPU being separate from the number of robots;
- at least one network control CPU for transmitting and receiving signals between each of the robots, the at least one network control CPU being separate from the robot control CPU;
- at least one work tool control CPU for operating a number of tools when the robots are operating, the tools being connected to the robots;
- wherein the at least one work tool control CPU is separate from the number of work tools, and separate from each of the other CPUs; and
- wherein the at least one work tool control CPU includes a pressing force control CPU for spot welding and a welding current control CPU for controlling a current associated with the spot welding, each of said robot control CPU, said pressing force control CPU, and said welding current control CPU being formed in the form of a board and separate from each other;
- a shared memory, shared by the robot control CPU, the at least one network control CPU, and the at least one work tool control CPU, the shared memory storing data associated with operation of the robot control CPU, the at least one network control CPU, and the at least one work tool control CPU; and
- a system bus constructed to (i) transmit information between the robot control CPU, the at least one network control CPU, and the at least one work tool control CPU and the memory, wherein all of the CPUs and the memory are coupled to the system bus and are integrated with each other through said system bus, and (ii) provide for synchronous operation of the robots, and the tools when the information is transmitted.

* * * * *